United States Patent
Negley, III et al.

(10) Patent No.: US 7,624,042 B2
(45) Date of Patent: Nov. 24, 2009

(54) IN DISPENSER POINT-OF-SALE MODULE FOR FUEL DISPENSERS

(75) Inventors: Scott R. Negley, III, Austin, TX (US); David K. Blanchard, Taylor, TX (US)

(73) Assignee: Dresser, Inc., Addison, TX (US)

( * ) Notice: Subject to any disclaimer, the term of this patent is extended or adjusted under 35 U.S.C. 154(b) by 643 days.

(21) Appl. No.: 10/411,524

(22) Filed: Apr. 10, 2003

(65) Prior Publication Data
US 2004/0204999 A1 Oct. 14, 2004

(51) Int. Cl.
*G06Q 20/00* (2006.01)

(52) U.S. Cl. .............. 705/16; 705/21; 235/381

(58) Field of Classification Search .............. 700/231, 700/232; 705/26, 27
See application file for complete search history.

(56) References Cited

U.S. PATENT DOCUMENTS

| | | | |
|---|---|---|---|
| 3,184,714 A | 5/1965 | Brown, Jr. et al. | |
| 3,786,421 A | 1/1974 | Wostl et al. | |
| 6,032,126 A | 2/2000 | Kaehler | |
| 6,128,551 A * | 10/2000 | Davis et al. | 700/236 |
| 6,152,591 A * | 11/2000 | McCall et al. | 700/231 |
| 6,193,154 B1 | 2/2001 | Phillips et al. | |
| 6,427,912 B1 * | 8/2002 | Levasseur | 235/381 |
| 6,687,345 B1 | 2/2004 | Swartz et al. | |
| 6,725,106 B1 | 4/2004 | Covington et al. | |
| 6,736,313 B1 * | 5/2004 | Dickson | 235/380 |
| 6,801,835 B2 | 10/2004 | Covington et al. | |
| 2002/0116261 A1 * | 8/2002 | Moskowitz et al. | 705/14 |
| 2002/0147648 A1 * | 10/2002 | Fadden et al. | 705/16 |
| 2002/0156835 A1 * | 10/2002 | Williams et al. | 709/203 |
| 2003/0055530 A1 | 3/2003 | Dodson | |
| 2004/0204999 A1 | 10/2004 | Negley, III et al. | |

FOREIGN PATENT DOCUMENTS

| WO | WO 02/11087 | 2/2002 |
|---|---|---|
| WO | WO 02/065377 | 8/2002 |

OTHER PUBLICATIONS

"No. 1 Convenience Store Chain Turns to NCR for Implementation of Store Solution", PRNewswire, May 25, 1999, p. 1.*
PCT International Search Report, PCT/US2004/024445, Apr. 4, 2005, pp. 4.
Notification of Transmittal of The International Search Report and The Written Opinion of the International Searching Authority of Application No. PCT/US2004/024445, filed Jul. 29, 2005; (17 pages) mailed Dec. 22, 2006.
Notification of Transmittal of The International Search Report and The Written Opinion of the International Searching Authority of Application No. PCT/US2006/044256 filed Nov. 14, 2006 and mailed Apr. 13, 2007 (8 pages).
PCT International Search Report, PCT/US2004/024445, Apr. 4, 2005 (4 pages).

(Continued)

*Primary Examiner*—F. Zeender
*Assistant Examiner*—M. Thein
(74) *Attorney, Agent, or Firm*—Fish & Richardson P.C.

(57) ABSTRACT

A fuel dispenser including a dispenser manager for controlling electronic functions of a fuel dispenser, display, user interface and controller are coupled to the dispenser manager. The controller controls fuel dispensing components of the fuel dispenser coupled to the dispenser manager. A point-of-sale module is associated with the dispenser manager for providing point-of-sale functionalities within the fuel dispenser.

22 Claims, 4 Drawing Sheets

OTHER PUBLICATIONS

Notification of Transmittal of The International Search Report of the International Searching Authority of Application No. PCT/US2004/024445, filed Jul. 29, 2007 and mailed Dec. 22, 2006 (12 pages).
Notification of The Written Opinion of the International Searching Authority of Application No. PCT/US2004/024445, filed Jul. 29, 2007 and mailed Sep. 13, 2006 (5 pages).
Communication from EP Associate re Examination Report on EP Appl. No. 04 779 490.4, mailed Jun. 4, 2007 (7 pages).
PCT Written Opinion of the International Searching Authority, PCT/US2004/024445, Apr. 4, 2005, pp. 1-6.
PCT International Preliminary Report on Patentability, PCT/US2004/024445, Dec. 22, 2006, pp. 1-12.
European Examination Report, EP Application No. 04 779 490.4, May 5, 2008, pp. 1-5.
PCT International Preliminary Report on Patentability, PCT/US2006/044256, Mar. 12, 2008, pp. 1-11.

* cited by examiner

IN DISPENSER POINT-OF-SALE MODULE FOR FUEL DISPENSERS

BACKGROUND OF THE INVENTION

1. Technical Field of the Invention

The present invention relates to fuel dispensers, and more particularly, to fuel dispensers including a point-of-sale control module within the fuel dispenser.

2. Description of Related Art

The retail petroleum industry utilizes various brands of fuel dispensers for dispensing fuel to customers. Some form of remote dispenser controller is typically used for controlling the dispensers. The remote dispenser controller is often located in a manner where a site attendant can monitor and control particular dispensers from a building at the site. The controllers send data signals (i.e., commands) to the dispensers which can include price, payment data for the fuel dispensed, preset amounts of fuel to dispense, and pump authorization to dispense fuel. The dispensers likewise send data signals to the controller including pump number, pump status and dispensed fuel volume and sale value.

Point-of-sale (POS) systems are widely used in the industry to control fuel dispensers. Point-of-sale systems generally utilize an open architecture hardware platform with POS application software programming to integrate functions including cash register, dispenser control, credit card, inventory management, processing, and scanning.

The problem with the interaction between existing point-of-sale systems and fuel dispensing systems is the dependency of the fuel dispenser on the external point-of-sale equipment. Existing dispensers are dumb devices, fully dependent upon the external point-of-sale equipment to control financial transactions and pump functions. Once the point-of-sale link between the point-of-sale equipment and the fuel dispenser is removed, the fuel dispensers are incapable of operation. Thus, there is a need for improving the functionality of fuel dispensers to enable them to continue operation in the absence of a link with the point-of-sale equipment control.

SUMMARY OF THE INVENTION

The present invention overcomes the foregoing and other problems with a fuel dispenser including a dispenser manager for controlling electronic functions of the fuel dispenser. POS functionality resides in the dispenser electronics to provide a layer of redundant fault tolerance. A controller controls the fuel dispensing components of the fuel dispenser. A point-of-sale module associated with the dispenser manager provides point-of-sale functionalities within the fuel dispenser.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE EXEMPLARY EMBODIMENTS OF THE INVENTION

Figure 1:
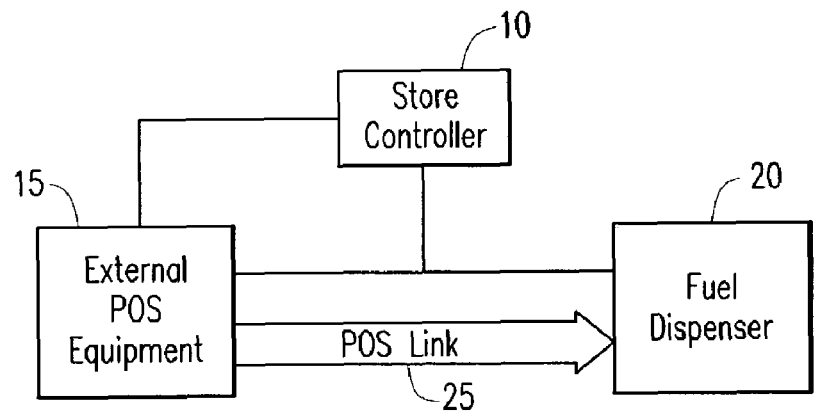
FIG. 1 is a block diagram illustrating the environment of operation of the system of the present invention.

Referring now to the drawings, and more particularly to FIG. 1, there is illustrated the operating environment of the system of the present invention. An optional store controller 10 and external point-of-sale (POS) equipment 15 are interconnected with a fuel dispenser 20. While FIG. 1 only illustrates a single fuel dispenser 20, it should be realized that the store controller 10 and external POS equipment 15 would normally be interconnected with multiple fuel dispensers at a retail fuel dispensing facility. The fuel dispenser 20 within existing systems is a dumb device which is fully dependent upon information transmitted to the fuel dispenser 20 from the external POS equipment 15 over a POS link 25. The transmitted POS information enables the POS equipment 15 to control financial transactions and pump functions.

The present invention includes an in-dispenser point-of-sale module 30 (FIG. 2) within a fuel dispenser 20 enabling the fuel dispenser 20 to conduct business in a stand alone mode even if the point-of-sale equipment 15, HUB 35 or the POS link 40 should go down. This improved system is more fully illustrated in FIG. 2. The point-of-sale equipment 15 provides point-of-sale functionalities which may include cash register, dispenser control, transaction card processing, and/or bar code scanning. Store controller 10 is optionally coupled to the point-of-sale equipment 15 and the fuel dispenser 20 via a hub 35. The point-of-sale equipment 15 generates customer activated terminal (CAT) and pump commands which are transmitted to the fuel dispenser 20 through the hub 35 via link 40. The site controller 10 and diagnostic and asset management functionalities 45 are linked with hub 35 via link 50.

The fuel dispenser 20 includes a dispenser manager 55, a pair of VGA displays 60 including soft keys and a controller 65 for managing peripheral elements or bezel. The dispenser manager 55 or In-Dispenser POS 30 drives the content associated with the VGA display(s) 60 provide interaction with a customer. The bezel controller 65 provides for and controls user inputs to the fuel dispenser 20. The dispenser computer 70 controls fuel storage tank submersible pumps and fuel control valves and monitors fuel flow information via metering and reporting sub systems, totals by grade, errors, etc. The dispenser manager 55 also interoperates with the dispenser computer 70 to deliver commands and receive transaction data and status. The dispenser manager 55 issues commands to the dispenser computer 70 over an internal communications link 75 of a given dispenser 20. Control, status, real-time diagnostic, error codes and data are also exchanged over the internal communications link 75. The dispenser computer 70 controls all hydraulic elements of the dispenser necessary to carry out fuel dispensing functionalities. The dispenser computer 70 also drives sale progress displays on the sales/volume displays of the dispenser 20. The dispenser manager 55 also collects and maintains status of the fuel dispenser 20 and reports the status information to the site controller 10 and/or point-of-sale equipment 15.

An in-dispenser point-of-sale module 30 associated with the dispenser manager 55 within the fuel dispenser 20 provides a fault tolerant architecture assuring equipment functionality in the event that the POS equipment 15, HUB 35 or link 40 crashes or otherwise goes off-line. All relevant POS functionalities reside within the in-dispenser POS module 30 including, but not limited to, store/forwarding, transaction logging, URL and credit card processing. This is really a subset of that functionality necessary to operate a pump autonomously that reside in the POS equipment of the store host. A number of databases 80 would be stored within a memory 98 in the fuel dispenser 20 to include the data necessary for the operation of the in dispenser POS module 30 in its stand alone mode. This information could include, but is not limited to URLs 80*a* or display content consisting of customer instructional prompts, fueling status information, advertisements, etc., various business rules 80*b* (consisting of fuel prices, tender medial authorization information, pump operational rules, etc.) for operation of the point-of-sale system, and completed transaction and error logs 80*c*.

Figure 2:
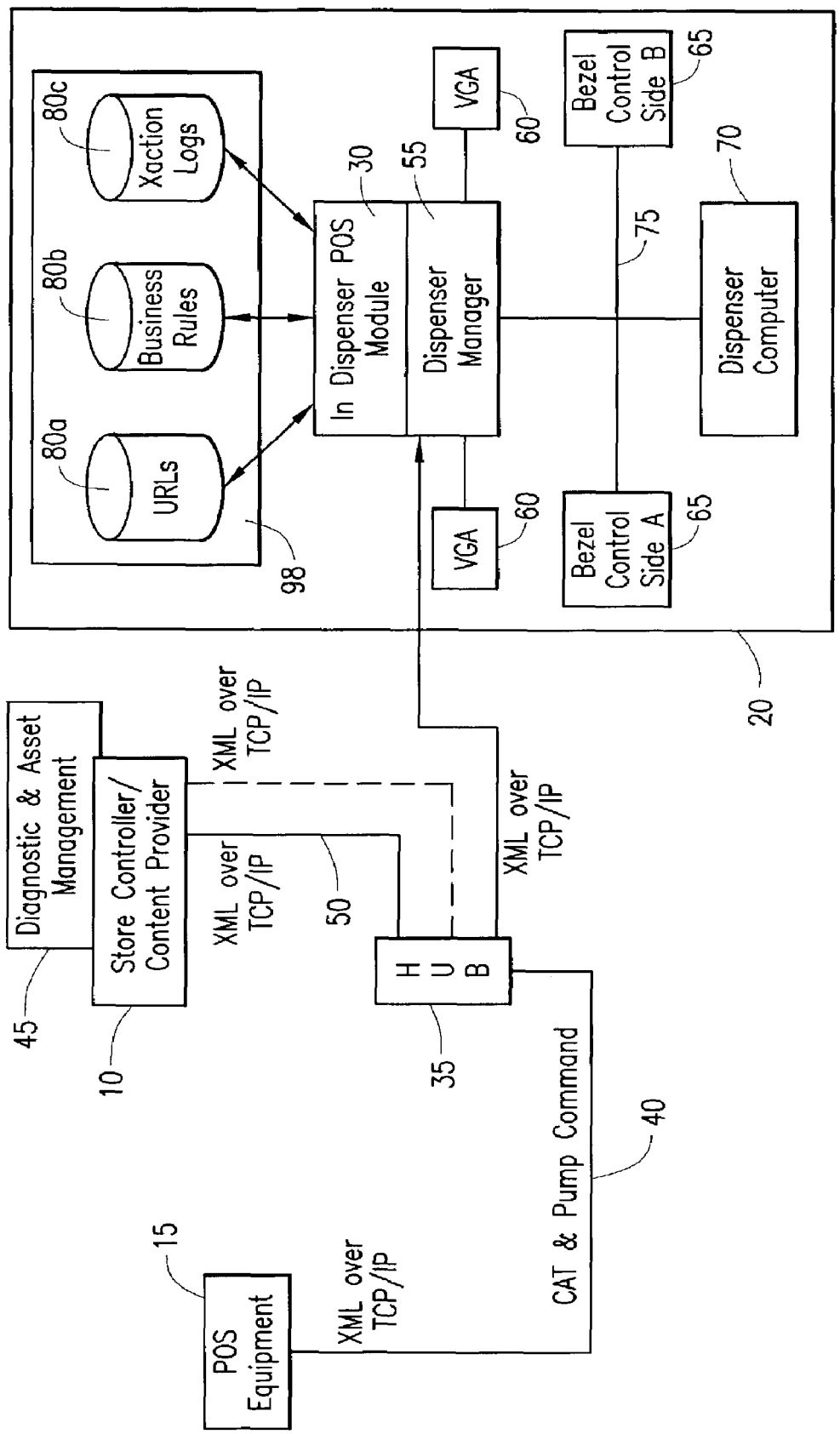
FIG. 2 illustrates the fuel dispenser having in-dispenser point-of-sale module according to the present invention.
Figure 3:
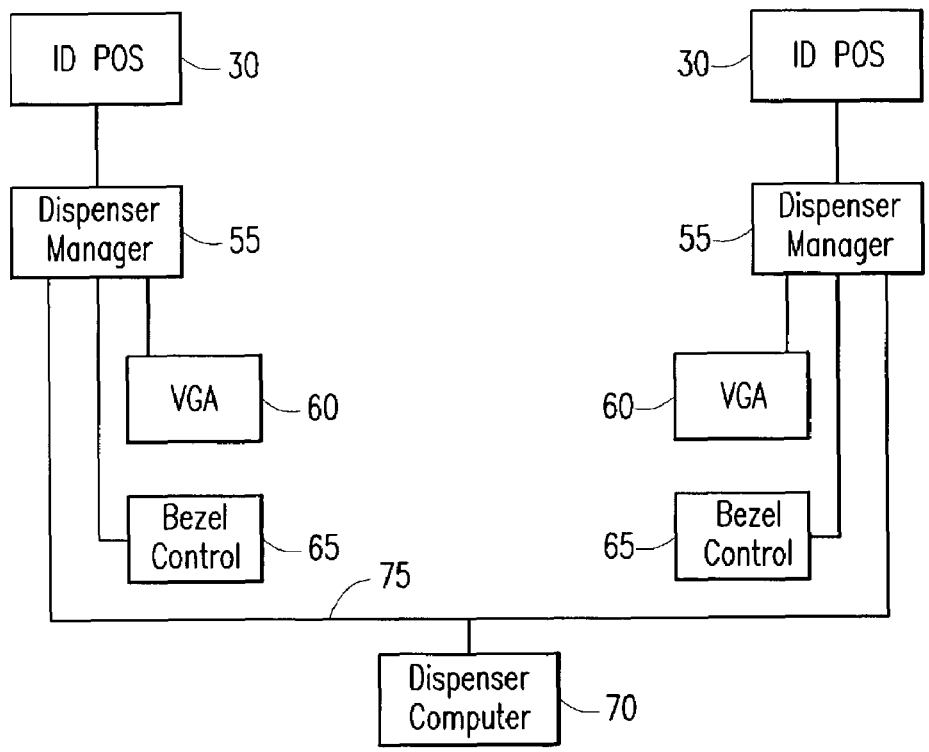
FIGS. 3-5 illustrate alternative configurations of a fuel dispenser which may include a point-of-sale module.
Figure 4:
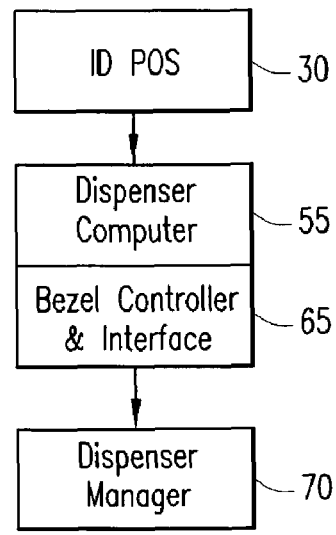
Figure 5:
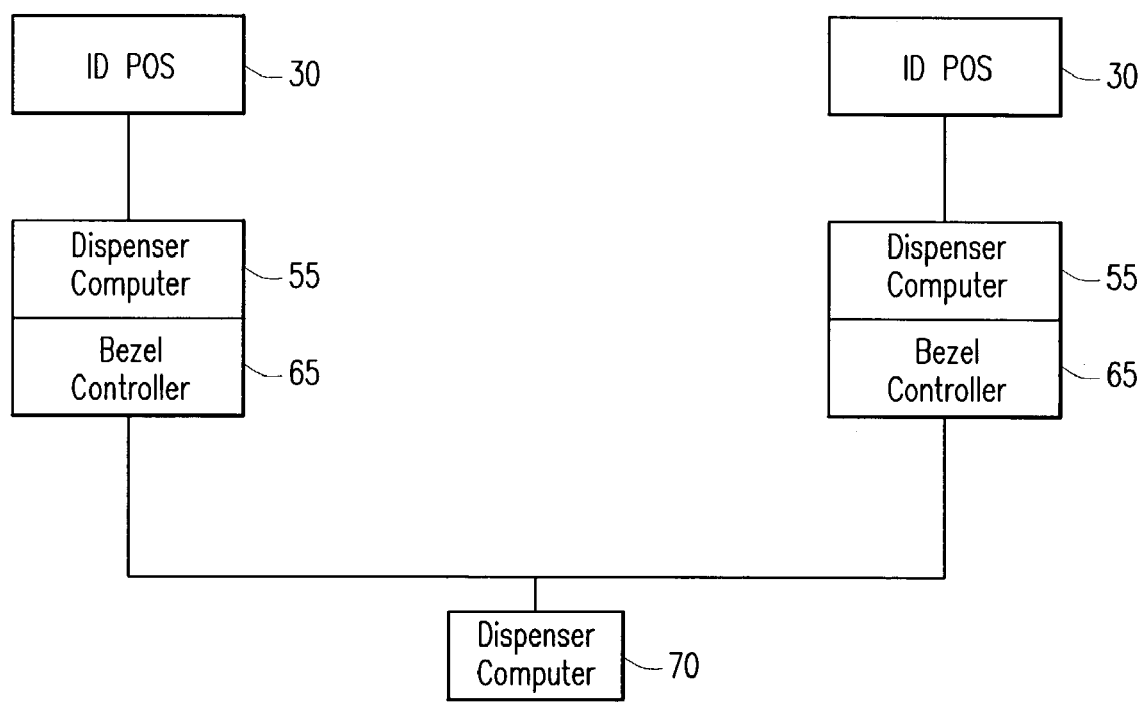

The fuel dispenser 20 with which the point-of-sale module 30 is associated is not limited to the configuration illustrated in FIG. 2. It may also include a number of different configurations as illustrated in FIGS. 3-5 wherein like components are identified by similar reference numeral. The functions of the fuel dispensers and their associated components are similar to those as described with respect to FIG. 2

Figure 6:
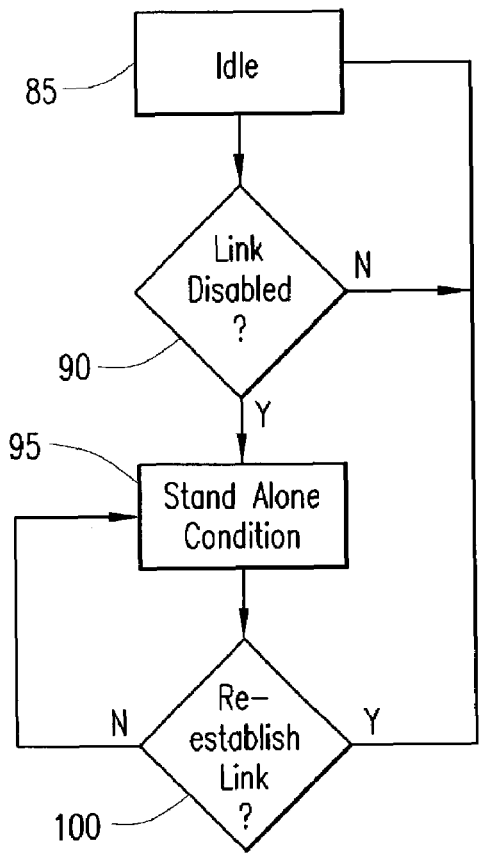
FIG. 6 is a flow diagram describing the operation of the in-dispenser point-of-sale module.

Referring now also to FIG. 6, there is described the operation of the in dispenser POS module 30. The in dispenser POS module 30 remains in an idle condition at 85 while the external POS equipment 50 is operating in normal application mode. However, once inquiry step 90 determines that the link with the external POS equipment 15 is lost, the in dispenser point-of-sale module 30 begins to operate in a stand alone condition at 95 until inquiry step 100 determines that the POS link with the external equipment has been re-established. After the external POS link is re-established, the in dispenser POS module 30 returns to the idle condition. Alternatively, the in-dispenser POS module may operate on a full time basis. This would enable a scaled back version of the of the store controller 10 as described with respect to FIG. 1 since most POS functionalities could be handled by the fuel dispenser.

The previous description is of a preferred embodiment for implementing the invention, and the scope of the invention should not necessarily be limited by this description. The scope of the present invention is instead defined by the following claims.

We claim:

1. A fuel dispenser, comprising:
   a dispenser manager for controlling electronic functions of the fuel dispenser;
   a display coupled to the dispenser manager;
   a user interface coupled to the dispenser manager;
   a dispenser computer controlling sale and pump control functions coupled to the dispenser manager;
   the fuel dispenser operable to allow a credit-card transaction for payment of a fuel-dispensing request while the fuel dispenser is in communication with external transaction-card processing equipment; and
   a point-of-sale module within the fuel dispenser, the point-of sale module associated with the dispenser manager and operable to authorize, using locally stored rules for authorization of credit cards, a credit-card transaction for payment of a fuel-dispensing request during at least a portion of a period of time of loss of communication with external transaction-card processing equipment and transmit, to the external transaction-card processing equipment, information associated with the authorized credit-card transaction after reconnection of the fuel dispenser with the external transaction-card processing equipment, wherein the point-of-sale module remains in an idle state when the fuel dispenser has a connection to an external point-of-sale link and becomes active responsive to disconnection of the external point-of-sale link.

2. The fuel dispenser of claim 1, wherein the point-of-sale module does not require the external point-of-sale link for operation.

3. The fuel dispenser of claim 1, wherein the point-of-sale module returns to the idle state responsive to reconnection of the external point-of-sale link.

4. The fuel dispenser of claim 1, wherein the point-of-sale module operates in full time state.

5. The fuel dispenser of claim 1, further including at least one database accessible by the point-of-sale module including point-of-sale data.

6. The fuel dispenser of claim 5, wherein the point-of-sale data comprises URLs.

7. The fuel dispenser of claim 5, wherein the point-of-sale data comprises display content consisting of customer instructional prompts, fueling status information, and advertisements.

8. The fuel dispenser of claim 5, wherein the point-of-sale data comprises Business Rules.

9. The fuel dispenser of claim 5 wherein the point-of-sale data comprises fuel prices, tender media authorization information, and pump operational rules.

10. The fuel dispenser of claim 5, wherein the point-of-sale data comprises completed transaction and error logs.

11. The fuel dispenser of claim 1, wherein the dispenser manager communicates with external devices using at least one of XML over a TCP/IP link or PNA wireless.

12. The fuel dispenser of claim 1, wherein the user interface further includes a bezel control.

13. The fuel dispenser of claim 1, wherein the user interface comprises a video display and soft keys.

14. The fuel dispenser of claim 1, wherein the user interface comprises a touchscreen.

15. A fuel dispenser, comprising:
   a dispenser manager for controlling electronic functions of the fuel dispenser;
   a display coupled to the dispenser manager;
   a bezel control coupled to the dispenser manager;
   a dispenser computer for sale and pump control function of the fuel dispenser coupled to the dispenser manager;
   the fuel dispenser operable to allow a credit-card transaction for payment of a fuel-dispensing request while the fuel dispenser is in communication with external transaction-card processing equipment;
   a point-of-sale module within the fuel dispenser, the point-of-sale module associated with the dispenser manager and operable to authorize, using locally stored rules for authorization of credit cards, a credit-card transaction for payment of a fuel-dispensing request during at least a portion of a period of time of loss of communication with external transaction-card processing equipment and transmit, to the external transaction-card processing equipment, information associated with the authorized credit-card transaction after reconnection of the fuel dispenser with the external transaction-card processing equipment, wherein the point-of sale module remains in an idle state when the fuel dispenser has a connection to an external point-of sale link and becomes active responsive to disconnection of the external point-of sale link; and
   at least one database within the fuel dispenser accessible by the module including the credit-card transaction data.

16. The fuel dispenser of claim 15, wherein the point-of-sale module does not require the external point-of sale link for operation.

17. The fuel dispenser of claim 15, wherein the point-of-sale data comprises URLs.

18. The fuel dispenser of claim 15, wherein the point-of-sale date comprises display content consisting of customer instructional prompts, fueling status information, and advertisements.

19. The fuel dispenser of claim 15, wherein the point-of-sale data comprises Business Rules.

20. The fuel dispenser of claim 19 wherein the point-of-sale data comprises fuel prices, tender media authorization information, and pump operational rules.

21. The fuel dispenser of claim 15, wherein the point-of-sale data comprises completed transaction and error logs.

22. The fuel dispenser of claim 15 wherein the dispenser manager communicates with external devices using at least one of XML over a TCP/IP link or PNA wireless.

* * * * *

UNITED STATES PATENT AND TRADEMARK OFFICE
CERTIFICATE OF CORRECTION

PATENT NO. : 7,624,042 B2 Page 1 of 1
APPLICATION NO. : 10/411524
DATED : November 24, 2009
INVENTOR(S) : Scott R. Negley, III et al.

It is certified that error appears in the above-identified patent and that said Letters Patent is hereby corrected as shown below:

On the Title page at (75) Inventors, insert --Craig Lewis, Arvada, CO (US) and Daniel C. Harrell, Round Rock, Texas (US)--.

In Claim 18, Column 5, line 2, delete "date" and insert --data--, therefore.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,624,042 B2 | Page 1 of 1 |
| APPLICATION NO. | : 10/411524 | |
| DATED | : November 24, 2009 | |
| INVENTOR(S) | : Negley, III et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this

Twenty-sixth Day of October, 2010

David J. Kappos
*Director of the United States Patent and Trademark Office*